May 12, 1964  G. S. SMITH ETAL  3,132,948
CONTINUOUS PRODUCTION OF BULGUR
Filed Aug. 8, 1962

G.S. SMITH, E.J. BARTA
AND M.E. LAZAR.
INVENTORS
BY
ATTORNEYS

United States Patent Office 3,132,948
Patented May 12, 1964

3,132,948
CONTINUOUS PRODUCTION OF BULGUR
George S. Smith, Concord, Edward J. Barta, Albany, and Melvin E. Lazar, Oakland, Calif., assignors to the United States of America as represented by the Secretary of Agriculture
Filed Aug. 8, 1962, Ser. No. 215,754
5 Claims. (Cl. 99—80)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its primary object the provision of novel processes for the continuous production of bulgur. Further objects and advantages of the invention will be evident from the following description wherein parts and percentages are by weight unless otherwise specified.

Figure 1:
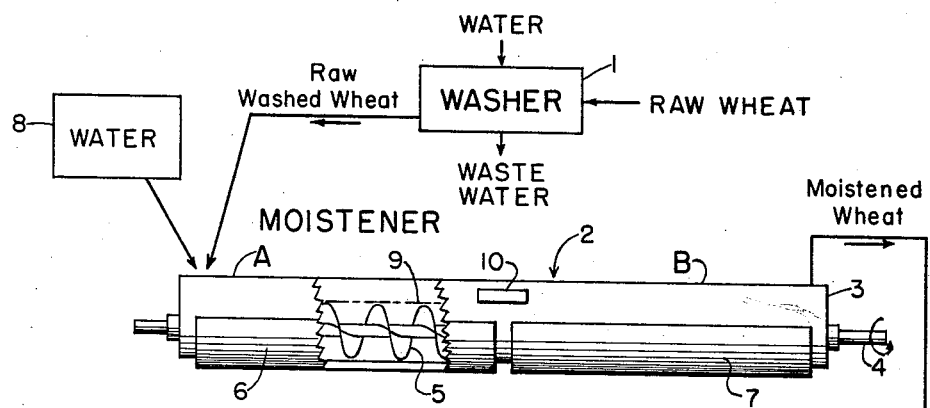
Figure 2:
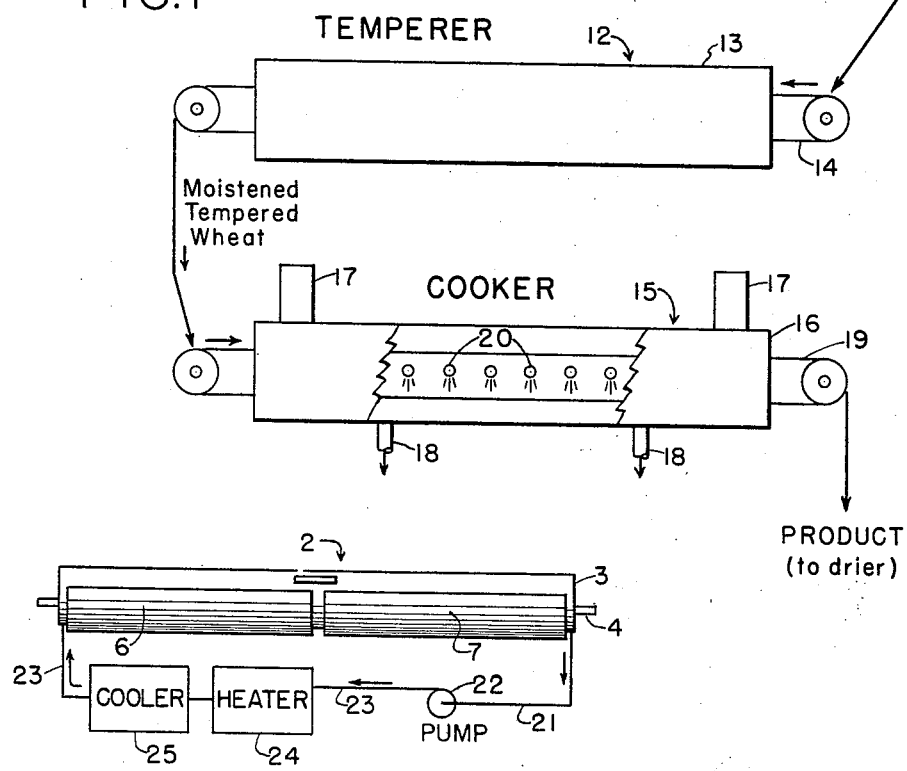

In the annexed drawing, FIG. 1 schematically depicts apparatus suitable for carrying out the process of the invention. The figure also illustrates the flow of material through the system. FIG. 2 illustrates an alternative form of the moistening device.

Bulgur is a food product particularly used in the Middle Eastern countries. Essentially, it is dry, parboiled wheat which has culinary uses similar to those of rice. Traditionally, bulgur is prepared by simmering the whole wheat berry in water until the grains become tender. The cooked grains are then spread in the sun to dry. As a final step, the dry grains are subjected to rubbing to remove the outer bran layers and the grains may then be cracked in a mill. The traditional methods are based on batch procedures and hence are not suitable for large-scale operations. Recently it has been demonstrated that bulgur may be produced on a continuous basis. This process, disclosed in U.S. Patent 2,884,327, involves moistening the raw wheat to bring its water content to a level of at least 40%, cooking the moistened grain with steam under superatmospheric pressure, drying the cooked grain, pearling to remove some of the bran, cracking, and screening.

Although the known process outlined above provides the goal of continuous operation, it presents several disadvantages from the standpoint of efficiency and economy. A primary disadvantage of the process is the long time—12 hours—required for moistening the grain prior to cooking. Another disadvantage of the process is that it requires cooking under superatmospheric pressure.

The process of the present invention is not only adapted for continuous operation but obviates the disadvantages of the prior procedure. A primary advantage of the present invention is that the moisturizing is accomplished rapidly—in a matter of about 90 minutes. Because of this rapid action, the apparatus used in the present process is much smaller (⅛ the size) than the prior apparatus, while handling the same throughput of material. This, of course, means that the process of the invention involves greatly reduced equipment and operating costs. Also, because of the rapid moistening action in the present process, the opportunity for microbial action with subsequent development of off-flavors in the product is essentially eliminated. An important aspect of the present invention is that although the moisturizing is accomplished rapidly, the wheat grains do not burst nor become sticky. According to prior knowledge it would have been expected that rapid moisturizing would injure the product by causing the grains to burst or become sticky so they could not be cooked or dried properly. Another advantage of the present system is that cooking is conducted under atmospheric pressure conditions. This factor provides substantial economies in initial apparatus expense and operating costs.

The principles and operation of the process of the invention are explained below in conjunction with the FIG. 1 in the annexed drawing.

The starting material used in the process of the invention is raw wheat that has previously been subjected to conventional cleaning operations by screening, blowing with air streams, or the like, to remove chaff, foreign seeds, broken kernels, and kernels of abnormal size. As a preliminary step in the process of the invention this cleaned material is subjected to a conventional water-washing operation. This can be accomplished, for example, by passing the wheat through a reel washer 1 where it is contacted with sprays of water for a short period of time, generally about 2 minutes, to wash away dirt particles, residual chaff, etc.

In the first stage of the process the washed raw wheat is moistened so that its moisture content is raised to a level of about 40 to 50% $H_2O$. This moistening can be suitably accomplished in the apparatus generally designated as 2. This apparatus includes a U-shaped trough 3 provided with a shaft 4 and screw 5. Shaft 4 is rotated by a suitable drive means such as a variable speed electric motor (not illustrated). About the bottom and sides of trough 3 are disposed a pair of heating jackets 6 and 7 through which heating media may be circulated to maintain the contents of the system at the desired temperature levels. Two separate jackets are provided so that the forward half of trough 3 (designated as A) and the rear half of trough 3 (designated as B) can be maintained at different temperature levels whereby the wheat in passing through trough 3 can be subjected to progressively increasing temperatures. Thus, it has been determined that rapid moistening of the grain, coupled with minimum damage thereto, is attained when the wheat is heated to progressively higher temperatures starting with about 135° F. at the feed end of trough 3, gradually increasing to about 155° F. at the midpoint of the trough, and further increasing to about 185° F. at the exit end of the trough. Although we have successfully achieved such progressive heating with a system with two heating jackets, it is obvious that one could provide a larger number of individually controlled heating jackets for like purpose.

In operation, water is introduced into the system to provide a level in trough 3 somewhat above the top edge of screw 5. This level, designated 9, is maintained approximately constant during operation. Raw washed wheat (from washer 1) and water (from reservoir 8) are simultaneously introduced at the feed end of trough 3. The water is introduced at a rate sufficient to compensate for the moisture absorbed by the wheat in its passage through the trough, so as to maintain the desired water level 9 in trough 3. In a typical embodiment of the invention where the wheat has been subjected to a 2-minute preliminary wash, it will contain about 22% water and in such case the amount of water introduced at the feed end of trough 3 will be approximately 40 lbs. per 100 lbs. of washed wheat entering the trough. Generally, the water is introduced hot—for example, at about 150°–180° F.—so that the mixture of wheat and water will come more quickly to the desired temperature. It is obvious that the wheat will not assume the temperature of the hot water because the washed wheat is near room temperature and a cooling effect is attained as the wheat and hot water are mixed. The speed of rotation of shaft 4 is correlated with the pitch of screw 5 so that the wheat is propelled to the exit end of the trough in about 60 minutes. The rate of feeding of wheat and water are so correlated that as the wheat is moved through the trough it is constantly covered with water. Since wheat has a density higher than that of water, one might consider the system as one wherein the grains are propelled through the system while submerged in a pool of hot water. In order to maintain the wheat submerged in the water and to prevent it from climbing the sides of the trough 3 by the torque of the screw 5, it is preferred to provide a conventional vibrator 10 on the side of trough. This vibrator has the effect of what might be termed fluidizing the grains so that they behave en masse as a liquid. By using the vibrator in cooperation with the screw 5, one is also assured that each particle of wheat is positively moved through the system at essentially the same rate of travel. This is a feature of the present system which further differentiates it from prior systems wherein the wheat is moved by gravity resulting in non-uniform flow so that some kernels of wheat have either an excessive or an insufficient residence time in the system. Such non-uniform residence time leads to undesirable bursting of kernels in the case of excessively treated grains and to products which are not properly gelatinized on subsequent cooking, in the case of kernels which have been insufficiently treated.

While the wheat is propelled through trough 3, the flow of heating medium through jackets 6 and 7 is adjusted so that the temperature of the water and the wheat in the forward half (A) of trough 3 is progressively increased from about 135° F. up to about 155° F. and the temperature of the material in the rear half (B) of trough 3 is progressively increased from about 155° F. up to about 185° F. As the wheat progresses through trough 3, water penetrates into the grains so that by the time they reach the exit end of the trough their moisture content is about 40%–50%, preferably 40%–45%.

In the second stage of the process, the moistened wheat is tempered; that is, it is held or aged so that the moisture in the grains can equilibrate. Thus during the moisturizing step, the water which enters the grains is largely concentrated in areas near the surface. During the tempering operation this moisture can diffuse into the grains so that it will be more uniformly distributed therein and the moisture content at the centers of essentially all the kernels will have reached the level required to obtain starch gelatinization during the subsequent cooking operation. The tempering operation simply involves holding the moisturized grains for a period of time, preferably while keeping the moisturized grains hot, as by insulating the tempering device, whereby the distribution of moisture occurs rapidly. It is obvious that instead of using a thermally insulated device, or in conjunction with such a device, one could provide heating jackets to replace the heat lost by radiation and conduction to maintain the wheat during the tempering period in a hot condition, i.e., at about 165°–180° F. Referring now to the drawing, FIG. 1, the reference numeral 12 indicates the continuous tempering device. This device consists of an insulated housing 13 and an endless mesh belt 14 traversed by conventional drive means. In operation, the moisturized grain is lifted out of moisturizer 2 by a suitable apparatus such as a chain-rake lift or screw conveyor and fed onto belt 14. This belt carries the moistened grain through housing 13 wherein it remains hot and equilibration takes place rapidly. The residence time in the tempering device will depend on the time that the wheat has remained in the moistener; thus, the longer the wheat has resided in moistener 2, the shorter will be the residence time required in temperer 12. For example, when the residence time in moistener 2 is 60 minutes, the moistened wheat is held in the temperer 12 for about 30 minutes.

In the third stage of the process, the tempered wheat is cooked to gelatinize the moistened starch in the grains. Thus, the tempered wheat is fed from the exit end of temperer 12 into the cooker generally designated as 15 in the drawing, FIG. 1. This cooker includes a housing 16 and vents 17 for release of excess steam. Also provided are conduits 18 for draining condensed water from the system. A continuous mesh belt 19 traverses the length of the cooker. This belt is driven by conventional means not illustrated in the drawing. The tempered grain is fed onto the end of the belt and carried through the system where it is subjected to steam issuing from nozzles 20. The speed of traversal of belt 19 is so regulated that the grain is subjected to the steam at atmospheric pressure (212° F.) for about 15 to 20 minutes. The cooked product delivered at the exit end of the belt is then treated in conventional manner to provide the finished bulgur product. The conventional steps applied to the cooked wheat are ordinarily drying, partial debranning, cracking, and screening, all as well known in the art.

As noted hereinabove, a feature of the invention is that the raw grain is moistened to the appropriate level in a mere fraction of the time required in prior practice. This desirable goal is achieved in the present system because the wheat is progressively heated while maintained in contact with excess water. Thus by moving the wheat through the system while it is submerged in a pool of hot water, the wheat is always in contact with an amount of water above that required for moistening. As a result, the imbibition of water by the wheat takes place very rapidly. This principle of heating the grain while in contact with excess water is a feature entirely distinct from prior continuous procedures wherein the grain is treated in a series of steps in each of which it is sprayed with the amount of water which it can absorb during a subsequent holding period. Moreover, it would have been expected that heating the grain with excess water would be damaging by causing sloughing or bursting of the grain. Such effects, however, have not been observed and we have found that the heating of the grain with excess water in the described manner results in rapid moisturizing of the grain without causing any damage to the grain. Moreover, the results obtained by our system are so effective as concerns uniform penetration into the individual grains that the treated grain can be cooked with steam at atmospheric pressure, thus dispensing with the expense and cumbersome features of cooking under superatmospheric pressure conditions.

Another feature of the invention which contributes to the effectiveness of our moisturizing treatment is that the temperature of the wheat is progressively increased and that the initial temperature applied to the wheat is relatively low, namely, about 135° F. This progressive heating results in effective moistening of the grain without causing any significant bursting or sloughing. In contrast, we have found that if the wheat is heated too rapidly, as by applying an initial temperature of 150°–165° F., a considerable proportion of burst kernels were produced.

In the preferred method of conducting the cooking, the moistened grains are contacted with steam while they are supported on a mesh belt. This has the advantage that water—formed by condensation of steam when it strikes the relatively cooler grain and equipment surfaces—can drain away from the product. Were the moistened grain to be cooked while in contact with this excess of water, rupture of grains would result. Accordingly, another feature of the present invention is that the cooking is carried out in the absence of liquid water or, otherwise stated, under conditions wherein the wheat is subjected to draining to remove liquid water.

Reference is now made to FIG. 2 which illustrates an alternative arrangement of the moistening system. In this system, moistener 2 is of the same construction as in FIG. 1 and operated in the same manner as previously described. However, in the present modification, means is provided for recirculating the pool of water which is maintained in trough 3. This recirculation system has the advantage of minimizing any possibility of growth of thermophilic organisms in the moistener. Since such organisms are relatively resistant to heat, there is a possibility that they may grow in the cooler parts of the system and cause off-flavors in the product. By providing this recirculation system, the pool of water in trough 3 is positively moved through the system to prevent formation of stagnant areas which might provide the foci for growth of thermophiles. The water recirculation unit consists of a pipe 21 which draws water from the exit end of trough 3. This water is forced by pump 22 through associated conduit 23 to the feed end of the trough. A heat exchanger 24 may be interposed in conduit 23 to heat the water to pasturization temperature if its temperature—usually about 180–185° F.—is not sufficient to eliminate thermophilic organisms. It is further preferred that a cooler 25 be interposed in conduit 23 in order to cool the heated water to a level such that it will not upset the temperature level (about 135° F.) desired at the feed end of trough 3.

In the illustrated modifications of moistener 2, the wheat is propelled through the system by the action of screw 5. It will be obvious to those skilled in the art that it is not essential to use a screw conveyor for this purpose. Any other type of device by which the wheat can be positively moved without causing breakage of kernels would be equally satisfactory. Thus, for example, use can be made of a rake conveyor or a drag conveyor system.

EXAMPLES

The invention is further demonstrated by the following illustrative examples.

In the examples, gelatinization of the cooked wheat was determined in the following way: One hundred grains are removed from the batch, cut transversely with a razor blade and the endosperm of the grains examined for the occurrence of white centers. The number of grains which contain white centers are counted and this figure is reported as the white center count. The significance of the test is that if complete gelatinization of starch granules occurs the endosperm is translucent, whereas if the gelatinization is only partial, the ungelatinized material will show up as milky-white or opaque spots, often referred to as white centers, snake eyes, or fish eyes. For the production of a good quality bulgur, the white center count should be low, i.e., less than 10% and preferably should be essentially zero.

Example I (a) In this run, an apparatus essentially as shown in FIG. 1 was used in producing bulgur from Kansas hard red winter wheat. Trough 3 had a width of 6 inches and was 10 feet long. The flow of heating medium through jacket 6 was so controlled that material at the feed end of the trough was 135° F. and the material leaving section A and progressing to section B was at 155° F. Average temperature of the material in section A was 145° F. The flow of heating medium through jacket 7 was so controlled that the material at the feed end of section B was 155° F. and the material at the exit end of section B was at 185° F. Average temperature of the material in section B was 175° F.

Cleaned wheat was fed into reel washer 1 at the rate of 48 lbs. per hour. In the washer the wheat was sprayed with tap water for 2 minutes, then fed into trough 3. Concomitantly, water at 160° F. was continuously fed into the feed end of trough 3 at a rate sufficient to compensate for the moisture absorbed by the wheat during its passage through the trough, so as to maintain the described water level in the trough. Screw 5 was rotated at the speed required to give the wheat a residence time of one hour in trough 3, that is, approximately ½ hour in section A and ½ hour in section B.

The moistened product was removed from the exit end of trough 3. Its moisture content was 44%.

(b) The moistened wheat was then held at about 165° F. for 30 minutes in the insulated tempering device 12. The tempered product had a moisture content of 43%.

(c) The tempered wheat was then conveyed to the cooker 15 where it was contacted with steam at atmospheric pressure (212° F.) for 15 minutes. The cooked wheat had a moisture content of 46% and was not sticky. Essentially all of the cooked grains had retained their intact form.

(d) The cooked wheat was then dried by spreading it at a loading rate of approximately 20 lbs. per square foot on wire-mesh trays and exposing it to an air stream that flowed through the bed of grain with entering air at 180° F. The product had a moisture content of 9.1% and the white center count was 2%. The product milled satisfactorily and was of good quality.

Example II

In this run, Washington white club wheat was treated as described in Example I except that the cooking time in part (c) was increased to 20 minutes.

The cooked product had a moisture content of 45% and was not sticky. The dried product had a white center count of 6% and was of good quality.

Having thus described the invention, what is claimed is:

1. A process for preparing bulgur which comprises feeding raw wheat and water into a treatment zone, positively moving the wheat through the treatment zone while maintaining it constantly submerged in an amount of water in excess of that which can be absorbed by the grain, applying heat to progressively increase the temperature of wheat and water from a temperature of about 135° F. at the beginning of the treatment to a temperature of about 185° F. at the end of the treatment, the said treatment being continued until the moisture content of the grain is about 40 to 50%, separating the moistened grain from the excess water, tempering the moistened grain to obtain uniform distribution of moisture in the grains, and cooking the moistened tempered grain by contacting it with steam.

2. The process of claim 1 wherein the moistened grain is cooked by contacting it with steam under atmospheric pressure and while draining liquid water away from the wheat.

3. A process for preparing bulgur which comprises feeding raw wheat and water into a treatment zone, positively moving the wheat through the treatment zone while keeping it submerged in the water, the total amount of water in the system being in excess of the amount which can be absorbed by the wheat, applying heat to progressively increase the temperature of the wheat and the water from a temperature of about 135° F. at the beginning of the treatment to a temperature of about 185° F. at the end of the treatment, the said treatment being continued until the moisture in the grain is about 40 to 50%, separating the moistened grain from the excess water, tempering the moistened grain while hot for a period of about 30 minutes to obtain uniform distribution of moisture in the grains, and cooking the moistened tempered grain by subjecting it to steam at atmospheric pressure while draining liquid water away from the wheat so that cooking takes place in the presence of water vapor but in the absence of liquid water.

4. A process for preparing bulgur which comprises feeding raw wheat and water into a treatment zone, positively moving the wheat through the treatment zone while keeping it submerged in the water, the total amount of water in the system being in excess of the amount which can be absorbed by the wheat, applying heat to progressively increase the temperature of the wheat and the water from a temperature of about 135° F. at the beginning of the treatment to a temperature of about 185° F. at the end of the treatment, the said treatment being continued until the moisture in the grain is about 40 to 50%, separating the moistened grain from the excess water, tempering the moistened grain by holding it at said moisture content and at a temperature of about 165 to 180° F. for about 30 minutes to obtain uniform distribution of moisture in the grains, cooking the moistened tempered grain by subjecting it to steam at atmospheric pressure while draining liquid water away from the wheat so that cooking takes place in the presence of water vapor but in the absence of liquid water, and drying the cooked grain.

5. A process for preparing bulgur which comprises feeding raw wheat and water into a treatment zone, positively moving the wheat through the treatment zone while keeping it submerged in the water, the total amount of water in the system being in excess of the amount which can be absorbed by the wheat, applying heat to progressively increase the temperature of the wheat and water from a temperature of about 135° F. at the beginning of the treatment to a temperature of about 185° F. at the end of the treatment, the said treatment being continued unil the moisture in the grain is 40 to 50%, separating the moistened grain from the excess water, tempering the separated moistened grain by holding it in the absence of excess water for a period of about 30 minutes at a temperature of about 165–180° F. to obtain uniform distribution of moisture in the grains, and cooking the moistened tempered grain by subjecting it to steam at atmospheric pressure while draining liquid water away from the wheat so that the cooking takes place in the presence of water vapor but in the absence of liquid water.

References Cited in the file of this patent
UNITED STATES PATENTS
2,884,327    Robbins _____ Apr. 28, 1959

OTHER REFERENCES

Haley et al.: "Cereal Science Today," vol. 5, No. 7, September 1960, pages 203, 204, 206, 207 and 214.